United States Patent
Brossard

(10) Patent No.: US 10,611,680 B2
(45) Date of Patent: Apr. 7, 2020

(54) GLAZING COMPRISING A PROTECTIVE UPPER LAYER MADE FROM HYDROGENATED CARBON

(71) Applicant: SAINT-GOBAIN GLASS FRANCE, Courbevoie (FR)

(72) Inventor: Sophie Brossard, Minneapolis, MN (US)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 16 days.

(21) Appl. No.: 15/538,217

(22) PCT Filed: Dec. 22, 2015

(86) PCT No.: PCT/FR2015/053727
§ 371 (c)(1),
(2) Date: Jun. 21, 2017

(87) PCT Pub. No.: WO2016/102892
PCT Pub. Date: Jun. 30, 2016

(65) Prior Publication Data
US 2018/0002222 A1  Jan. 4, 2018

(30) Foreign Application Priority Data

Dec. 23, 2014 (FR) ..................... 14 63247

(51) Int. Cl.
*C03C 17/36* (2006.01)
*C03C 17/22* (2006.01)
*C03C 17/34* (2006.01)

(52) U.S. Cl.
CPC .......... *C03C 17/3681* (2013.01); *C03C 17/22* (2013.01); *C03C 17/3441* (2013.01); *C03C 17/366* (2013.01); *C03C 17/3626* (2013.01); *C03C 17/3634* (2013.01); *C03C 17/3644* (2013.01); *C03C 17/3649* (2013.01); *C03C 17/3652* (2013.01); *B32B 2307/412* (2013.01); *B32B 2307/584* (2013.01); *C03C 2217/212* (2013.01); *C03C 2217/23* (2013.01); *C03C 2217/256* (2013.01); *C03C 2217/27* (2013.01); *C03C 2217/28* (2013.01); *C03C 2217/281* (2013.01); *C03C 2217/78* (2013.01); *C03C 2218/156* (2013.01)

(58) Field of Classification Search
CPC .............. C03C 17/3634; C03C 17/366; C03C 2217/78; C03C 17/3441; B32B 2307/412; B32B 2307/584
See application file for complete search history.

(56) References Cited

U.S. PATENT DOCUMENTS

| | | | |
|---|---|---|---|
| 2003/0129407 A1* | 7/2003 | Teer | C23C 14/0605 428/408 |
| 2003/0143401 A1* | 7/2003 | Hukari | C03C 17/3435 428/408 |
| 2005/0260419 A1 | 11/2005 | Hukari et al. | |
| 2007/0017624 A1* | 1/2007 | Thomsen | B08B 7/0071 156/99 |
| 2009/0141376 A1 | 6/2009 | Smith et al. | |
| 2010/0266823 A1 | 10/2010 | Hukari et al. | |
| 2011/0073176 A1* | 3/2011 | Kim | H01L 31/02167 136/256 |
| 2012/0094075 A1* | 4/2012 | Peter | C03C 17/23 428/142 |
| 2013/0058640 A1 | 3/2013 | Taki | |

FOREIGN PATENT DOCUMENTS

| | | | | |
|---|---|---|---|---|
| EP | 2 568 059 A1 | | 3/2013 | |
| JP | 06212429 A | * | 8/1994 | ......... C23C 14/0605 |
| WO | 2008/130735 A1 | | 10/2008 | |
| WO | 2010/139908 A1 | | 12/2010 | |

OTHER PUBLICATIONS

JP06212429A_translation (Year: 1994).*
International Search Report dated Apr. 1, 2016 in PCT/FR2015/053727 filed Dec. 22, 2015.
Chen, T.L. et al., "Paper; Graphene as an anti-permeation and protective layer for indium-free transparent electrodes," Nanotechnology, vol. 23, No. 39, Sep. 2012, XP020230097, pp. 1-6.
Zhao, Yuda et al., "Electronic Supplementary Information for Highly Impermeable and Transparent Graphene as Ultra-Thin Protection Barrier of Ag thin Films," Journal of Materials Chemistry C, Jun. 2013, XP055223864, pp. 1-4.

* cited by examiner

*Primary Examiner* — Scott R. Walshon
*Assistant Examiner* — Jasper Saberi
(74) *Attorney, Agent, or Firm* — Oblon, McClelland, Maier & Neustadt, L.L.P.

(57) ABSTRACT

A material including a transparent substrate coated with a stack acting on infrared radiation includes at least one functional layer and at least one upper protective layer deposited above at least a part of the functional layer. The upper protective layer is a hydrogenated carbon layer, within which layer the carbon atoms form carbon-carbon and carbon-hydrogen bonds and are essentially in an $sp^2$ hybridization state.

20 Claims, No Drawings

GLAZING COMPRISING A PROTECTIVE UPPER LAYER MADE FROM HYDROGENATED CARBON

The invention relates to a material and to a process for obtaining a material, such as a glazing, comprising a transparent substrate coated with a stack of thin layers acting on infrared radiation comprising at least one functional layer.

Materials comprising stacks acting on infrared radiation are used in "solar control" glazings targeted at reducing the amount of solar energy entering and/or in "low-e" glazings targeted at reducing the amount of energy dissipated toward the outside of a building or of a vehicle.

The functional layers are deposited between coatings based on dielectric materials which generally comprise several dielectric layers making it possible to adjust the optical properties of the stack.

The mechanical strength of these complex stacks is often insufficient, this being the case a fortiori when the functional layers are silver-based metal layers (or silver layers). This low strength is reflected by the appearance in the short term of defects, such as scratches, indeed even the complete or partial tearing of the stack during its use under standard conditions. All defects or scratches are liable to detrimentally affect not only the attractiveness of the coated substrate but also its optical and energy performance levels.

Upper protective layers are conventionally used for various purposes, in particular for improving the scratch resistance, the wet corrosion resistance and the resistance to high-temperature heat treatments.

In the case of "solar control" or "low-e" glazings, the aim is generally not to significantly increase the absorption in the visible region. This constraint has to be taken into account in the choice of materials constituting the stack and in particular the upper protective layers.

For example, upper protective layers based on titanium oxide or on mixed zinc tin oxide are known. These upper protective layers are not very absorbing. However, the substrates coated with such layers do not exhibit a satisfactory scratch resistance.

It is also known to use layers of carbon in the graphite or amorphous form for improving the scratch resistance.

"DLC" (Diamond-Like Carbon) amorphous carbon layers comprise carbon atoms in a mixture of $sp^2$ and $sp^3$ hybridization states. Such layers cannot be deposited by a conventional magnetron process. They are generally obtained by plasma-enhanced chemical vapor deposition (PECVD), by laser ablation, by arc sputtering or by ion beam deposition.

"Graphite" carbon layers comprise carbon atoms essentially in an $sp^2$ hybridization state. Such layers considerably increase the absorption in the visible region and the infrared region of the material comprising them. Consequently, these layers are used either as temporary protective layer or at low thicknesses, of the order of a nanometer.

When the graphite carbon layers are used as temporary protective layer, they can be removed during a heat treatment, by oxidation to give carbon dioxide. The residual absorption after heat treatment is minimal.

When the graphite carbon layers are used at thicknesses of the order of a nanometer, the improvement in the scratch resistance may be insufficient.

There exists a need to improve the scratch resistance of substrates coated with a stack acting on infrared radiation without modifying the optical properties, such as the absorption in the visible region.

The applicant has discovered, surprisingly, that the use as upper protective layer of a hydrogenated carbon layer, within which layer the carbon atoms forming carbon-carbon and carbon-hydrogen bonds are essentially in an $sp^2$ hybridization state, makes it possible to considerably improve the scratch resistance without modifying the absorption properties, this being the situation even when the thickness of the hydrogenated carbon layer is greater than 10 nm.

The invention relates to a material comprising a transparent substrate coated with a stack acting on infrared radiation comprising:
  at least one functional layer and
  at least one upper protective layer deposited above at least a part of the functional layer,
characterized in that the upper protective layer is a hydrogenated carbon layer, within which layer the carbon atoms form carbon-carbon and carbon-hydrogen bonds and are essentially in an $sp^2$ hybridization state.

The carbon layer obtained according to this process comprises carbon atoms forming carbon-carbon and carbon-hydrogen bonds essentially in an $sp^2$ hybridization state.

The hydrogenated carbon layer comprises carbon and hydrogen. These elements are bonded together via carbon-carbon and carbon-hydrogen bonds. According to the invention, the carbon atoms of the hydrogenated carbon layer forming carbon-carbon and carbon-hydrogen bonds are essentially in an $sp^2$ hybridization state. It is considered that the carbon atoms of the layer are essentially in an $sp^2$ hybridization state when at least 80%, at least 90%, indeed even at least 100%, of the carbon atoms are in an $sp^2$ hybridization state. The hybridization of the carbon atoms can be characterized by Fourier transform infrared (FTIR) spectroscopy.

The carbon layer according to the invention differs in this characteristic from the "DLC" layers, which are layers of optionally hydrogenated amorphous carbon comprising carbon atoms in a mixture of $sp^2$ and $sp^3$ hybridization states, preferably essentially the $sp^3$ hybridization state. The carbon atoms forming the carbon-carbon and carbon-hydrogen bonds are not essentially in an $sp^2$ hybridization state.

The protective layer based on hydrogenated carbon according to the invention can be obtained by magnetic-field-assisted cathode sputtering, for example using a graphite target. The atmosphere in the deposition chamber comprises a neutral gas, preferably argon, and a hydrocarbon. The hydrocarbon can be chosen from methane or acetylene.

The amounts of hydrogen present in a hydrogenated carbon layer can be measured by an elastic recoil detection analysis (ERDA). This method makes it possible to determine the amounts of hydrogen present per unit of surface area analyzed. The results obtained correspond to the number of hydrogen atoms per $cm^2$.

It is considered according to the invention that a carbon layer is hydrogenated when it comprises at least 10% of hydrogen atoms with respect to the total number of carbon and hydrogen atoms in the hydrogenated carbon layer.

According to advantageous embodiments, the hydrogenated carbon layer according to the invention exhibits, in increasing order of preference, at least 20%, at least 25%, at least 30%, of hydrogen atoms, with respect to the total number of carbon and hydrogen atoms in the hydrogenated carbon layer.

Other spectroscopic analytical methods can be used to show that the carbon layer is hydrogenated and to quantify the amounts of hydrogen, such as "FRES" (Forward Recoil Elastic Scattering) spectroscopy.

It is possible to vary the amounts of hydrogen in the hydrogenated carbon layer by adjusting the proportions of hydrocarbon in the atmosphere of the deposition chamber.

For example, an atmosphere comprising argon and 5% by volume of methane or acetylene with respect to the volume of argon makes it possible to obtain a hydrogenated carbon layer comprising at least 20% of hydrogen atoms with respect to the total number of carbon and hydrogen atoms in the hydrogenated carbon layer. An atmosphere comprising argon and 10% by volume of methane with respect to the volume of argon makes it possible to obtain a hydrogenated carbon layer comprising at least 30% of hydrogen atoms with respect to the total number of carbon and hydrogen atoms in the hydrogenated carbon layer.

A nonhydrogenated carbon layer, that is to say which is not obtained by deliberately adding a hydrocarbon to the deposition atmosphere, all the same comprises surface hydrogen atoms. By comparison measurement, a nonhydrogenated carbon layer comprises less than 10% of hydrogen atoms with respect to the total number of carbon and hydrogen atoms, measured by ERDA.

The upper protective layer has a thickness:
of greater than or equal to 1 nm, of greater than or equal to 5 nm, of greater than or equal to 7 nm or of greater than or equal to 10 nm, and/or
of less than or equal to 50 nm, of less than or equal to 30 nm or of less than or equal to 20 nm.

According to one embodiment of the material according to the invention, the hydrogenated carbon layer has a thickness of at least 1 nm and comprises at least 34% of hydrogen atoms with respect to the total number of carbon and hydrogen atoms.

According to another embodiment of the material according to the invention, the hydrogenated carbon layer has a thickness of greater than or equal to 10 nm and comprises at least 27% of hydrogen atoms with respect to the total number of carbon and hydrogen atoms.

The hydrogenated carbon layer preferably exhibits a refractive index of less than 2.0 or of less than 1.8, measured at the wavelength of 550 nm.

The hydrogenated carbon layers are much less absorbing than the nonhydrogenated carbon layers. These hydrogenated carbon layers do not necessarily have to be removed by heat treatment and may exhibit greater thicknesses. This is because the hydrogenated carbon layers do not significantly modify the absorption of the material even when they exhibit thicknesses of greater than 10 nm. These thick upper protective layers contribute a very significant improvement to the scratch resistance, in comparison with permanent thin conventional protective layers, that is to say layers not intended to be removed, based on titanium dioxide ($TiO_2$), on mixed zinc tin oxide ($SnZnO_x$) or on nonhydrogenated graphite carbon.

There exists a synergy related to the use of a layer of carbon which is both thick, in particular of the order of 10 nm, and hydrogenated. This synergy is reflected by a better scratch resistance being obtained than that obtained with a thin hydrogenated carbon layer or a thick nonhydrogenated carbon layer.

The variation in the light absorption in the visible region ΔAbs. brought about by the upper protective layer is less than 10%, preferably less than 5% and better still less than 2%. The variation is obtained by measuring the light absorption of a substrate coated with a stack not comprising an upper protective layer (Abs. Ref.) and of one and the same coated substrate comprising the upper protective layer (Abs. Inv.) and by then carrying out the following calculation: ΔAbs.=(Abs. Ref.−Abs. Inv.).

The materials according to the invention can, when the applications require it, exhibit, in the visible region, a high light transmission and a low light absorption. For these applications, the light absorption in the visible region of the material can be less than 15%, preferably less than 10% and better still less than 8%.

All the light characteristics presented in the present description are obtained according to the principles and methods described in the European standard EN 410 relating to the determination of the light and solar characteristics of the glazings used in glass for the construction industry. Abs. is understood to mean, within the meaning of the present description, the absorption at normal incidence, under the D65 illuminant, with a field of vision of 2°.

The use of an upper protective layer exhibiting both a high degree of hydrogenation and a high thickness results in excellent scratch resistance properties, while keeping the absorption in the visible region low.

The stack is deposited by magnetic-field-assisted cathode sputtering (magnetron process). According to this advantageous embodiment, all the layers of the stack are deposited by magnetic-field-assisted cathode sputtering.

Unless otherwise mentioned, the thicknesses alluded to in the present document are physical thicknesses and the layers are thin layers. Thin layer is understood to mean a layer exhibiting a thickness of between 0.1 nm and 100 micrometers.

Throughout the description, the substrate according to the invention is regarded as positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one or more layers inserted between these two layers.

The functional layer is preferably chosen from:
a functional metal layer based on silver or on a silver-containing metal alloy,
a functional metal layer based on niobium,
a functional layer based on niobium nitride.

The functional layers are preferably silver-based functional metal layers.

A silver-based functional metal layer comprises at least 95.0%, preferably at least 96.5% and better still at least 98.0% by weight of silver, with respect to the weight of the functional layer. Preferably, the silver-based functional metal layer comprises less than 1.0% by weight of metals other than silver, with respect to the weight of the silver-based functional metal layer.

The thickness of the silver-based functional layers is, in increasing order of preference, of from 5 to 20 nm, from 8 to 15 nm.

Preferably, the stack comprises at least one functional layer and at least two coatings based on dielectric materials, each coating comprising at least one dielectric layer, so that each functional metal layer is positioned between two coatings based on dielectric materials.

The dielectric layers of the coatings based on dielectric materials exhibit the following characteristics, alone or in combination:
they are deposited by magnetic-field-assisted cathode sputtering,
they are chosen from dielectric layers having a barrier function, they are chosen from oxides or nitrides of one or more elements chosen from titanium, silicon, aluminum, tin and zinc, they have a thickness of greater than 5 nm, preferably of between 8 and 35 nm.

Dielectric layers having a barrier function is understood to mean a layer made of a material capable of forming a barrier to the diffusion of oxygen and water at high temperature, originating from the ambient atmosphere or from the transparent substrate toward the functional layer. The dielectric layers having a barrier function can be based on silicon compounds chosen from oxides, such as $SiO_2$, silicon nitrides $Si_3N_4$ and oxynitrides $SiO_xN_y$, optionally doped using at least one other element, such as aluminum, based on aluminum nitrides AlN or based on zinc tin oxide.

According to an advantageous embodiment, the stack comprises a dielectric layer based on silicon and/or aluminum nitride located above at least a part of the functional layer and below the upper protective layer. The dielectric layer based on silicon and/or aluminum nitride has a thickness:

of less than or equal to 100 nm, of less than or equal to 50 nm or of less than or equal to 40 nm, and/or of greater than or equal to 15 nm, of greater than or equal to 20 nm or of greater than or equal to 25 nm.

The dielectric layer based on silicon and/or aluminum nitride is preferably in contact with the upper protective layer.

The upper protective layer is preferably the final layer of the stack, that is to say the layer furthest from the substrate coated with the stack.

The stacks can additionally comprise blocking layers, the function of which is to protect the functional layers by preventing possible damage related to the deposition of a coating based on dielectric materials or related to a heat treatment. According to one embodiment, the stack comprises at least one blocking layer located below and in contact with a silver-based functional metal layer and/or at least one blocking layer located above and in contact with a silver-based functional metal layer.

Mention may be made, among the blocking layers conventionally used, in particular when the functional layer is a silver-based metal layer, of blocking layers based on a metal chosen from niobium Nb, tantalum Ta, titanium Ti, chromium Cr or nickel Ni or based on an alloy obtained from at least two of these metals, in particular on an alloy of nickel and chromium (NiCr).

The thickness of each blocking layer is preferably:
at least 0.5 nm or at least 0.8 nm and/or
at most 5.0 nm or at most 2.0 nm.

An example of a suitable stack according to the invention comprises:

a coating based on dielectric materials located below a silver-based functional metal layer, it being possible for the coating to comprise at least one layer based on silicon and/or aluminum nitride and one layer based on zinc oxide, optionally a blocking layer,
a silver-based functional metal layer,
optionally a blocking layer,
a coating based on dielectric materials located above the silver-based functional metal layer, it being possible for the coating to comprise a layer based on silicon and/or aluminum nitride,
an upper protective layer.

The transparent substrates according to the invention are preferably made of a rigid inorganic material, such as made of glass, in particular soda-lime-silica glass, or of an organic material based on polymers (made of polymer).

The organic transparent substrates according to the invention can also be made of polymer and are rigid or flexible. Examples of polymers which are suitable according to the invention comprise, in particular:

polyesters, such as polyethylene terephthalate (PET), polybutylene terephthalate (PBT) or polyethylene naphthalate (PEN);

polyacrylates, such as polymethyl methacrylate (PMMA);

polycarbonates;

polyurethanes;

polyamides;

polyimides;

fluorinated polymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);

photocrosslinkable and/or photopolymerizable resins, such as thiolene, polyurethane, urethane-acrylate, polyester-acrylate resins, and polythiourethanes.

The thickness of the substrate generally varies between 0.5 mm and 19 mm. The thickness of the substrate is preferably less than or equal to 6 mm, indeed even 4 mm. The material according to the invention may not be heat treated but it may be intended to undergo a high-temperature heat treatment chosen from an annealing, for example a flash annealing, such as a laser or flame annealing, a tempering and/or a bending. The implementation or not of a heat treatment on the material according to the invention will depend on the application for which said material is intended. The properties of the material according to the invention, demonstrated here, namely the scratch resistance, are independent of any one heat treatment.

The substrate coated with the stack can be a bent or unbent and/or tempered or untempered glass. It is said that it can be tempered and/or bent.

The material can be in the form of a monolithic glazing, of a laminated glazing or of a multiple glazing, in particular a double glazing or a triple glazing.

The invention also relates to a process for the preparation of a material comprising a transparent substrate coated with a stack acting on infrared radiation according to which there is deposited, by magnetic-field-assisted cathode sputtering, starting from the transparent substrate:

at least one functional layer and at least one upper protective layer deposited above at least a part of the functional layer, characterized in that the upper protective layer is a hydrogenated carbon layer obtained by sputtering a carbon target, preferably a graphite target, in a reactive atmosphere comprising a hydrocarbon.

The reactive atmosphere can comprise a hydrocarbon chosen from methane and acetylene. The reactive atmosphere can comprise argon.

According to embodiments of the invention, the atmosphere comprises at least 5% or at least 10% by volume of methane with respect to the volume of argon.

According to embodiments of the invention, the atmosphere comprises at most 25% or at most 20% by volume of methane with respect to the volume of argon.

Finally, the invention relates to the use of a material as described above for manufacturing a glazing. It can, for example, be a building or vehicle glazing.

EXAMPLES

Stacks of thin layers defined below are deposited on substrates made of clear soda-lime glass with a thickness of 4 mm.

For these examples, the conditions for deposition of the layers deposited by sputtering ("magnetron cathode" sputtering) are summarized in table 1 below.

TABLE 1

| | Targets employed | Deposition pressure | Gases | Index* |
|---|---|---|---|---|
| $Si_3N_4$ | Si:Al (92:8% by weight) | $8*10^{-3}$ mbar | Ar 47%—$N_2$ 53% | 2.00 |
| AZO | Zn:Al (2% by weight) | $1.5*10^{-3}$ mbar | Ar 91%—$O_2$ 9% | 1.90 |
| Ag | Ag | $8*10^{-3}$ mbar | Ar at 100% | — |
| NiCr | Ni:Cr (80:20% at.) | $2*10^{-3}$ mbar | Ar at 100% | — |
| $TiO_2$ | $TiO_x$ | $1.5*10^{-3}$ mbar | Ar 88%—$O_2$ 12% | 2.32 |
| C | Graphite | $1.5*10^{-3}$ mbar | Ar at 100% | 2.25 |
| C:H 5% | Graphite | $1.5*10^{-3}$ mbar | Ar 95%—$CH_4$ 5% | 1.70 |
| C:H 10% | Graphite | $1.5*10^{-3}$ mbar | Ar 90%—$CH_4$ 10% | 1.70 | at.: by atoms;
*at 550 nm

The nonhydrogenated carbon layers, denoted "C", are obtained without injection of methane into the argon atmosphere during the deposition of said layer.

The hydrogenated carbon layers, denoted "C:H X %", are obtained with injection of methane into the argon atmosphere during the deposition of said layer. X represents the percentage by volume of methane added to the argon. The percentages studied are 5% and 10% by volume, with respect to the volume of argon.

I. Determination of the Amounts of Hydrogen in the Protective Layers

The hydrogen content of hydrogenated carbon layers deposited on an $Si_3N_4$ underlayer was determined by the ERDA (Elastic Recoil Detection Analysis) technique. These analyses make it possible to determine the amount of hydrogen present in the layers. The concentrations correspond to the number of atoms per $cm^2$ of surface area analyzed.

The value given for hydrogen, No. of H, measured by ERDA, corresponds for these tests to the total number of hydrogen atoms present in a volume consisting of one $cm^2$ of a protective layer with a thickness of approximately 100 nm.

The value given for the concentration of (C+H), No. of (C+H), corresponds to the total number of hydrogen and carbon atoms present in a volume consisting of one $cm^2$ of a protective layer with a thickness of approximately 100 nm. This value is estimated from the theoretical density of carbon of 2.25 $g/cm^3$ and by quantification of the ERDA spectra by virtue of simulations.

Finally, in order to be freed from the thickness of the protective layer deposited, the ratio of the total number of hydrogen atoms per $cm^2$ of surface area analyzed, measured by ERDA, to the thickness of the layer is calculated and corresponds to the H/Thickness ratio with the thickness chosen in nm.

| Protective layer | Thickness (nm) | No. of H* | No. of (C + H) | H/(C + H) | H/Thickness ratio |
|---|---|---|---|---|---|
| C = nonhydrogenated | 100 | $90 \pm 5 \times 10^{15}$ | $1000 \times 10^{15}$ | 9% | $0.9 \times 10^{15}$ |
| C:H 5% = 5% hydrogenated | 110 | $297 \pm 15 \times 10^{15}$ | $1100 \times 10^{15}$ | 27% | $2.7 \times 10^{15}$ |
| C:H 10% = 10% hydrogenated | 125 | $425 \pm 20 \times 10^{15}$ | $1250 \times 10^{15}$ | 34% | $3.4 \times 10^{15}$ |

II. Optical and Mechanical Properties

The materials and the physical thicknesses in nanometers (unless otherwise indicated) of each layer of which the stack devoid of protective layer is composed are listed in the table below as a function of their positions with regard to the substrate carrying the stack.

| Stack devoid of protective layer | | Thickness |
|---|---|---|
| Coating based on dielectric materials | $Si_3N_4$ | 30 |
| | AZO | 5 |
| Blocking layer BO | NiCr | 0.5 |
| Functional layer | Ag | 10 |
| Coating based on dielectric materials | AZO | 5 |
| | $Si_3N_4$ | 30 |
| Substrate (mm) | glass | 4 |

The materials comprising the protective layers defined above were tested.

| Material | Cp. 1 | Cp. 2 | Cp. 3 | In. 1 | In. 2 | In. 3 | In. 4 | In. 5 | In. 6 |
|---|---|---|---|---|---|---|---|---|---|
| Protective layers | | | | | | | | | |
| C | 1 | 1 | 10 | — | — | — | — | — | — |
| C:H 5% | — | — | — | 1 | — | 1 | — | 10 | — |
| C:H 10% | — | — | — | — | 1 | — | 1 | — | 10 |
| $TiO_x$ | 2 | — | — | 2 | 2 | — | — | — | — |

Stack devoid of protective layer
Substrate

For each of these materials, light absorption in the visible region was measured according to the D65 illuminant at 10° Observer. Finally, all were subjected to the Erichsen scratch test (EST), which consists in applying a force to the sample, in newtons, using a tip (Van Laar tip, steel ball). Depending on the scratch resistance of the stack, different types of scratches can be obtained: continuous, noncontinuous, wide, narrow, and the like.

The EST score ranges from 0 to 1: 0 being the best and 1 the worst. This score was calculated from the EST scratch width at 0.7 N, measured in 3 distinct points using an optical microscope. The formula for calculating this score S is as follows:

$$S = \frac{W - W_{min}}{W_{max} - W_{min}}$$

W is the mean scratch width of the sample considered, $W_{min}$ that of the sample giving the smallest scratch width and $W_{max}$ the greatest.

| Material | Cp. 1 | Cp. 2 | Cp. 3 | In. 1 | In. 2 | In. 3 | In. 4 | In. 5 | In. 6 |
|---|---|---|---|---|---|---|---|---|---|
| Absorption (%) | 7-8 | 7-8 | 22-23 | 7-8 | 7-8 | 7-8 | 7-8 | 7-8 | 7-8 |
| Scratch width, 0.7 N | 1.2 | 1 | 0.5 | 0.8 | 1.2 | 1.2 | 0.5 | 0.2 | 0.1 |
| EST score | 1.00 | 0.82 | 0.36 | 0.64 | 1.00 | 1.00 | 0.36 | 0.09 | 0.00 |

The absorption of the hydrogenated carbon layers is greatly reduced with respect to the absorption of nonhydrogenated carbon layers. The hydrogenated carbon layers according to the invention, whatever their thickness (In. 1 to In. 6), exhibit an absorption equal to that obtained with conventionally used protective layers based on carbon of 1 nm (Cp. 1, Cp. 2).

These hydrogenated carbon layers can thus be used as thick protective layers without modifying the optical properties of the material, such as the absorption, and produce a significant improvement in the scratch resistance.

When the protective layer is a thin carbon-based layer, a scratch resistance is obtained which is reflected by EST scores of greater than 0.5: nonhydrogenated carbon layer of 1 nm (Cp. 1, Cp. 2), hydrogenated carbon layer of 1 nm (In. 1, In. 2, In. 3).

When the protective layer is a thick carbon layer, the scratch resistance is improved, which is reflected by lower EST scores and in particular scores lower than or of the order of 0.5 (Cp. 3, In. 5 and In. 6).

The use as a thick layer, in particular of the order of 10 nm, makes it possible to considerably improve the scratch resistance. It is found that, from the viewpoint of the scratch resistance, the results obtained for the materials of the invention comprising a 10 nm layer of hydrogenated carbon (In. 5=0.2; In. 6=0.1) are much better than those obtained for a thick nonhydrogenated carbon layer (Cp. 3=0.5). This shows that there exists a synergy related to the use of a thick carbon layer and of a hydrogenated carbon layer resulting in an excellent scratch resistance being obtained.

Finally, it is found that the hydrogenated carbon layers comprising high proportions of hydrogen exhibit a better scratch resistance whatever their thickness (In. 5 and In. 6).

The invention claimed is:

1. A material comprising a transparent substrate coated with a stack acting on infrared radiation and comprising:
   at least one functional layer; and
   at least one upper protective layer deposited above at least a part of the functional layer,
   wherein the upper protective layer is a hydrogenated carbon layer, within which layer the carbon atoms form carbon-carbon and carbon-hydrogen bonds and are essentially in an $sp^2$ hybridization state and which comprises at least 10% of hydrogen atoms with respect to the total number of carbon and hydrogen atoms,
   wherein the upper protective layer has a thickness of greater than 1 nm and less than or equal to 20 nm,
   wherein the variation in the light absorption in the visible region brought about by the upper protective layer is less than 10%, and
   wherein the substrate is made of glass or made of polymer.

2. The material as claimed in claim 1, wherein the material is configured to undergo a heat treatment.

3. The material as claimed in claim 1, wherein the material is untempered.

4. The material as claimed in claim 1, wherein the material is tempered.

5. The material as claimed in claim 1, wherein the material is tempered and/or bent.

6. The material as claimed in claim 1, wherein the upper protective layer has a thickness of greater than or equal to 5 nm and less than or equal to 20 nm.

7. The material as claimed in claim 1, wherein the upper protective layer has a thickness of greater than 10 nm and less than or equal to 20 nm.

8. The material as claimed in claim 1, wherein the hydrogenated carbon layer comprises at least 20% of hydrogen atoms, with respect to the total number of carbon and hydrogen atoms.

9. The material as claimed in claim 1, wherein the hydrogenated carbon layer comprises at least 25% of hydrogen atoms, with respect to the total number of carbon and hydrogen atoms.

10. The material as claimed in claim 1, wherein the hydrogenated carbon layer comprises at least 34% of hydrogen atoms, with respect to the total number of carbon and hydrogen atoms.

11. The material as claimed in claim 1, wherein the hydrogenated carbon layer has a thickness of greater than or equal to 10 nm and comprises at least 27% of hydrogen atoms with respect to the total number of carbon and hydrogen atoms.

12. The material as claimed in claim 1, wherein the functional layer is:
    a functional metal layer based on silver or on a silver-containing metal alloy,
    a functional metal layer based on niobium, or
    a functional layer based on niobium nitride.

13. The material as claimed in claim 1, wherein the stack further comprises at least two coatings based on dielectric materials, each coating comprising at least one dielectric layer, so that the at least one functional layer is positioned between two coatings based on dielectric materials.

14. The material as claimed in claim 1, wherein the stack comprises a dielectric layer based on silicon and/or aluminum nitride located above at least a part of the functional layer and below the upper protective layer.

15. A process for the preparation of the material according to claim 1, the process comprising:
    depositing, by magnetic-field-assisted cathode sputtering, starting from the transparent substrate:
      at least one functional layer and
      at least one upper protective layer deposited above at least a part of the functional layer,
    wherein the upper protective layer is a hydrogenated carbon layer obtained by sputtering a carbon target in a reactive atmosphere comprising a hydrocarbon.

16. The process for the preparation of a material as claimed in claim 15, wherein the reactive atmosphere comprises a hydrocarbon chosen from methane and acetylene.

17. The process for the preparation of a material as claimed in claim 15, wherein the reactive atmosphere comprises argon.

18. The process for the preparation of a material as claimed in claim 16, wherein the reactive atmosphere further comprises argon and there is at least 5% by volume of methane with respect to the volume of argon.

19. The process for the preparation of a material as claimed in claim 16, wherein the reactive atmosphere further comprises argon and there is at least 10% by volume of methane with respect to the volume of argon.

20. A method of using the material as claimed in claim 1, comprising:

manufacturing a glazing.

* * * * *